July 27, 1965   M. N. MOORE ETAL   3,196,987
ADJUSTABLE GEARED CAM AND ROLLER BRAKE SHOE ACTUATOR
Filed March 19, 1964   2 Sheets-Sheet 1

Monte N. Moore
Athol M. Moore
Daniel James Menter
INVENTORS

July 27, 1965 M. N. MOORE ETAL 3,196,987
ADJUSTABLE GEARED CAM AND ROLLER BRAKE SHOE ACTUATOR
Filed March 19, 1964 2 Sheets-Sheet 2

Monte N. Moore
Athol M. Moore
Daniel James Menter
INVENTORS.

3,196,987
**ADJUSTABLE GEARED CAM AND ROLLER
BRAKE SHOE ACTUATOR**
Monte N. Moore, Flushing, Athol M. Moore, Clio, and
Daniel James Menter, Saginaw, Mich., assignors to
Power Cam Corporation, Flint, Mich., a corporation of
Delaware
Filed Mar. 19, 1964, Ser. No. 353,179
15 Claims. (Cl. 188—79.5)

This invention comprises a novel and useful adjustable geared cam and roller brake shoe actuator and more particularly pertains to an adjustable brake construction and is a continuation-in-part application of our prior copending application Serial No. 268,134, filed March 26, 1963, now abandoned, and which latter is of a type similar to and constituting an improvement over the prior U.S. Patent No. 2,852,106, of September 16, 1958, which is owned by the assignee of the present application.

In wheel brake constructions of the type commonly employed for automotive vehicles and of the expanding shoe type, it is customary to provide a stationary carrier upon which a pair of arcuate opposed brake shoes are pivotally mounted for cooperation with and for enclosure within a rotatably mounted brake drum to which the wheel of the vehicle is attached. In such systems, the brake shoes are commonly mounted at one end of each upon fixed pivots, with the other end of the brake shoes carrying cam followers of a roller type receiving an actuating cam therebetween by which said other ends of the brake shoes are forced away from each other and into contact with the circumferentially extending wall of the brake drum while the shoes are returned to their disengaged position by spring means when the actuating means is released.

In such systems, a problem arises from the inevitable wear of the brake shoe lining and/or of the surface of the brake drum. When this occurs, the concentric relationship of the shoes and the drums is detrimentally affected so that the engagement of the brake lining with the drum is limited to only a small portion of the entire area of the brake shoe brake lining, thereby greatly impairing the efficiency of the brakes as well as contributing to a more rapid wear thereof. It is customary to adjust the spacing between the actuated ends of the brake shoes in order to compensate for this condition and thus render the same actuating means effective for imparting the proper actuating stroke to the brake shoes.

It is with systems of the above character that the present invention is concerned and the primary purpose of this invention is to provide a means for effecting with greater ease and precision of adjustment a regulation of the spacing of the cam followers on the actuated ends of the brake shoes with respect to the actuating cam disposed therebetween.

A further object of the invention is to provide a brake shoe adjusting means in accordance with the preceding object in which the cam followers of the pair of opposed brake shoes shall be capable of being individually adjusted towards and from each other.

A still further object of the invention is to provide an adjustable brake mechanism in accordance with the preceding objects wherein the cam followers may be very precisely adjusted by mean of the operation of mounting each follower upon an eccentric together with means for adjustably rotating the eccentric.

An additional object of the invention is to provide a brake adjusting mechanism in compliance with the above set forth objects which shall include novel and improved retaining means for securing the eccentrics upon which the cam followers are mounted in their adjusted positions together with an advantageous means for releasing the locking means in order to effect the adjustment of the cam follower eccentrics.

An additional object of this invention is to provide a brake adjusting mechanism as set forth in the foregoing objects and wherein a positive and greatly amplified range and/or rate of movement shall be imparted to the brake shoes relative to the actual throw of the brake actuating cam.

Yet another and more specific object of this invention is to provide a brake actuating means incorporated into a conventional brake shoe and brake drum brake assembly whereby an actuating cam imparts movement to the brake shoes through brake shoe rollers and whereby amplified movement of the rollers is obtained by providing the latter with eccentric bores by which they are journaled upon the eccentric drums of stationarily but adjustably mounted pivots.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
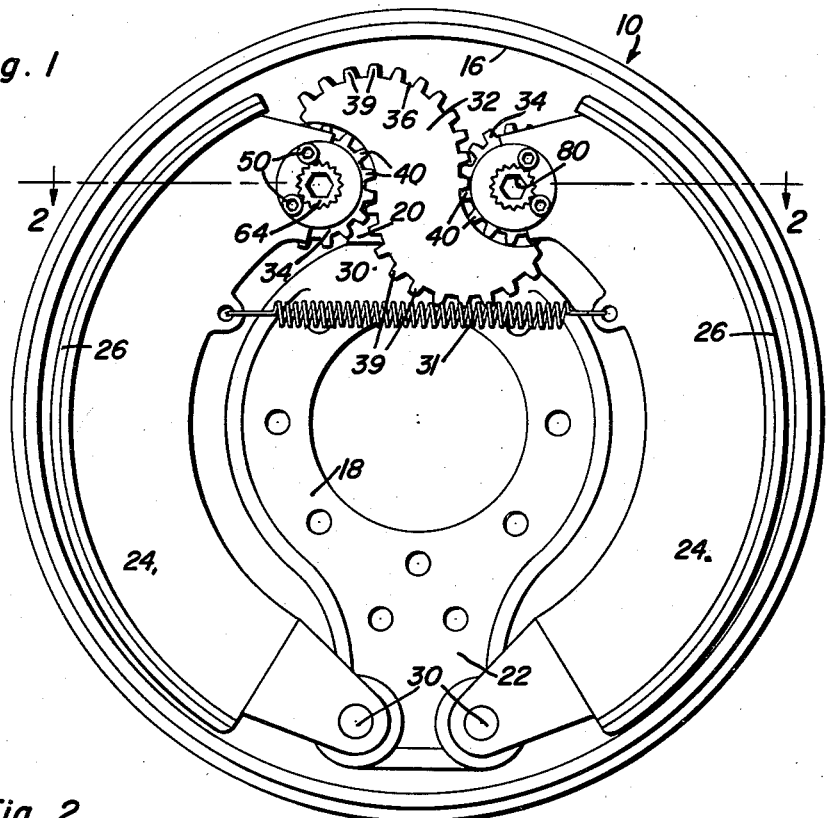
FIGURE 1 is a view in elevation of a brake assembly in accordance with this invention, the brake shoes being shown in their disengaged position from the brake drum.

In the accompanying drawings, a portion only has been illustrated of a conventional motor vehicle wheel brake assembly of a well known type to which the principles of this invention have been applied. Only sufficient components of the assembly have been shown to illustrate the manner in which the brake shoe adjusting means which forms the essence of this invention may be satisfactorily applied. Inasmuch as the other details of the wheel brake assembly are well known, and in themselves form no part of the present invention, a further description thereof is deemed to be unnecessary.

Briefly, however, the brake assembly includes a rotatably mounted brake drum 10 to which the vehicle wheel, not shown, is adapted to be attached, this brake drum including a circular end wall or disk 12 having a peripheral flange 14, the cylindrical internal surface 16 of which constitutes the brake surface of the drum. The wheel brake assembly further includes any conventional form of brake shoe carrier 18 having an upper portion 20 and a lower portion 22 for a purpose to be subsequently apparent.

Also forming part of the conventional vehicle brake assembly is a pair of opposed arcuate brake shoes each indicated by the numeral 24 which is provided with the usual brake linings 26 upon its convex exterior surfaces which cooperate with the cylindrical brake surface 16 of the brake drum for effecting the frictional braking action of the assembly.

By means of the usual pivot pins 30, one end of the brake shoes 24 is pivotally secured to the carrier projection 22 whereby the shoes may pivot thereabout. This last mentioned pivotal connection may be adjustable in various manners, not shown, to vary the spacing of the adjacent ends of the brake shoe linings from the brake drum surface 16, if desired. A tension spring 31 engages the opposed brake shoes to yieldingly urge them into brake releasing position or towards each other as will be apparent from FIGURE 1. Pivotally mounted upon the upper portion 20 is an S-shaped actuating cam 32 which cooperates with a pair of cam followers 34 in the form of rollers which are pivotally mounted upon the actuated ends of the brake shoes 24.

As set forth in the above mentioned prior patent, the actuating cam is provided with a pair of actuating surfaces as at 36 and 38 each of which is provided with a plurality of teeth 39 while the cam followers 34 are likewise correspondingly toothed as at 40 for continuous engagement and cooperation with the teeth 39 of the pair of cam surfaces 36 and 38.

The essence of the invention set forth and claimed hereafter resides in an organization of the above described character and includes a novel and advantageous construction by which the cam followers 34 are rotatably journaled upon the brake shoes 24 and are individually adjustable towards and from each other whereby to vary the spacing of the brake shoes and their linings with respect to the actuating cam and the brake surface 16 of the drums to thereby effectively and precisely adjust the initial and the final attitudes and positions of the brake shoe linings with respect to the brake drums and to amplify the actual extent of movement imparted by the actuating cam to the shoes.

Figure 2:
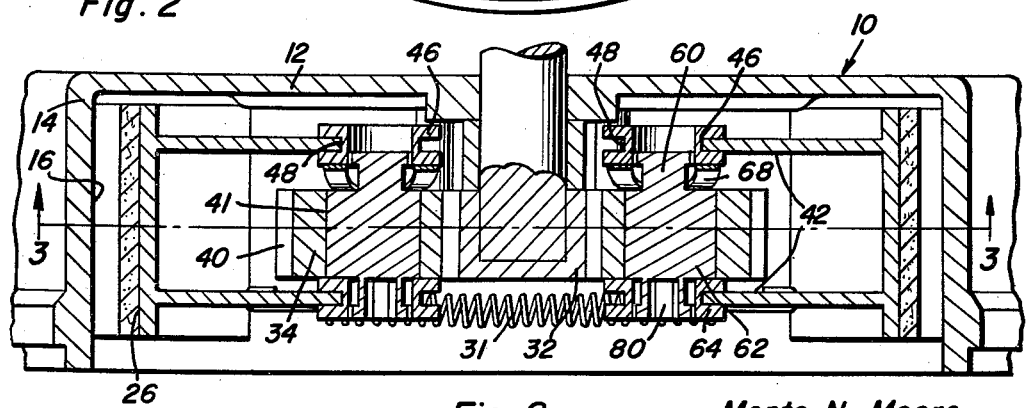
FIGURE 2 is a horizontal sectional view taken upon an enlarged scale substantially upon the plane indicated by the section line 2—2 of FIGURE 1.
Figure 8:
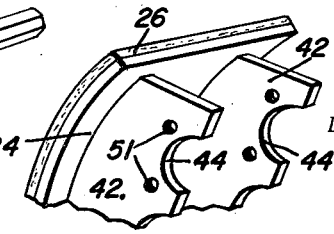
Figures 5, 6:
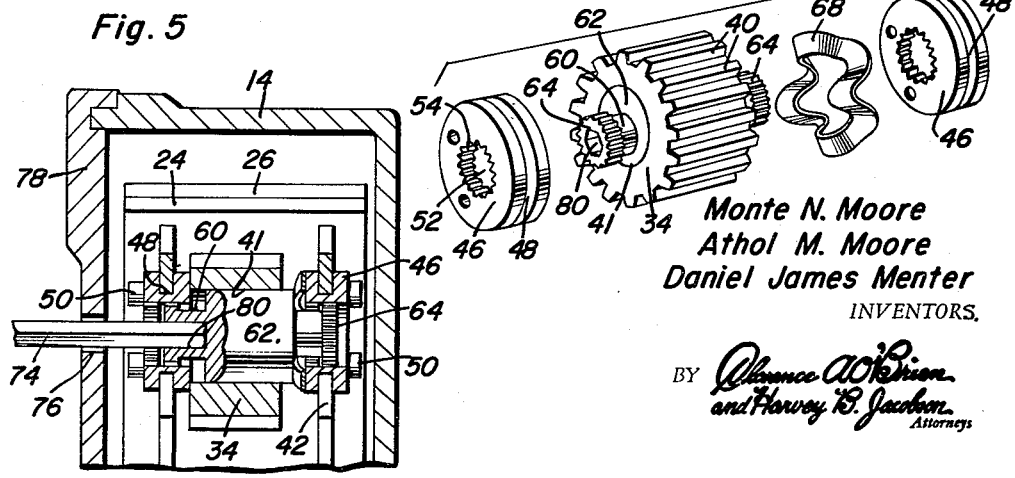
FIGURE 5 is a further detail view in vertical section through one of the cam followers, its mounting axle and eccentric and its bearing supports.
FIGURE 6 is an exploded perspective view of a cam follower and its associated locking element.

Referring now more particularly to FIGURES 2, 5 and 8, it will be observed that the brake shoes 24 have upon the concave sides of their actuated extremities pairs of mounting means consisting of parallel support plates or support members each indicated by the numeral 42. The support plates 42 which constitute ears or lugs are provided with arcuate seats 44 therein for the reception of bushings 46 or bearing members provided with circumferentially extending peripheral channels 48 which are received in these seats or notches 44 as shown in FIGURES 2 and 5. Fastening bolts or other fastening means as indicated at 50 serve to fixedly secure the bushings in a detachable manner to the bearing members or plates 42 as by engagement in the threaded bores 51.

Referring also to FIGURE 6 it will be observed that the bushings are provided with central bores 52 therethrough and splines or teeth 54 are provided in these bores to constitute locking elements.

Mounted in these bushings 46 and thus in the support plates or bearing supports 42 in an axle 60 which may have integrally formed therewith or detachably connected thereto an eccentric drum 62. The previously mentioned cam followers 34 are rotatably and freely mounted upon this drum as will be apparent from an inspection of FIGURES 2 and 5 in conjunction with FIGURE 6.

As shown in FIGURES 2, 3, 4 and 6, the said followers or rollers 34 are each provided with an eccentric bore 41 therethrough by which it is rotatably journaled upon the eccentric drum 62 of the roller axle or pivot 60. As set forth hereinafter, the eccentric drum 62 is stationarily but adjustably mounted upon the brake shoe. The roller 34 therefore turns freely upon the eccentric drum 62 by the roller eccentric bore 41. As a result of this eccentric mounting a dual action of the cam followers and brake shoes results.

Figure 3:
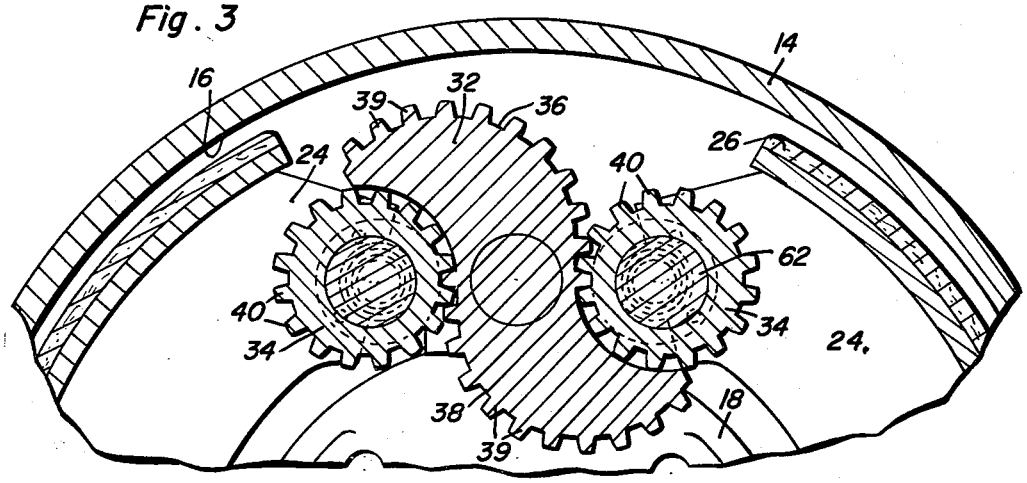
FIGURE 3 is an enlarged detail view in vertical transverse section taken substantially upon the plane indicated by the section line 3—3 of FIGURE 2 and showing the parts in brake released position.
Figure 4:
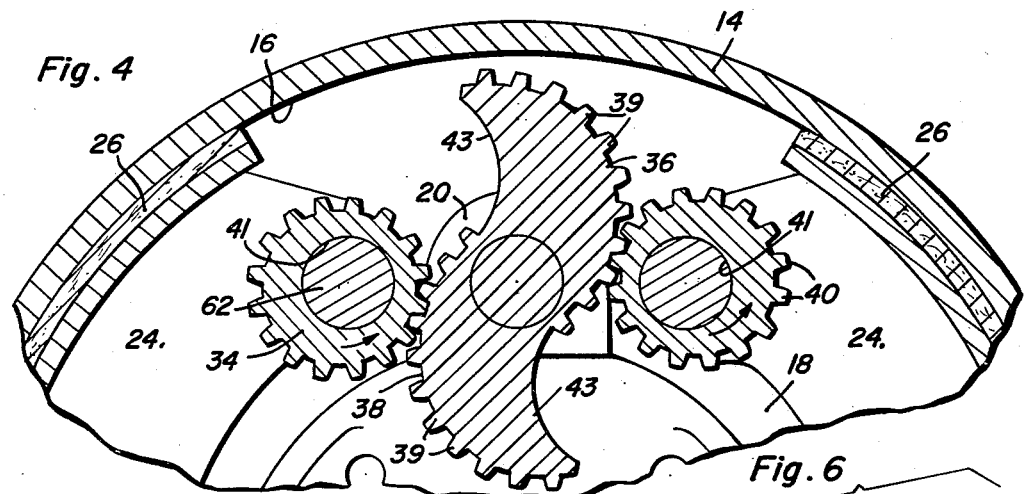
FIGURE 4 is a view similar to FIGURE 3 but showing the parts in brake engaged position.

When the actuating cam 32 is turned clockwise from its normal idle or brake release position of FIGURE 3 to the brake actuating position of FIGURE 4, the cam throw will move the cam followers 34 and their brake shoes outwardly or away from the axis of the cam by a distance corresponding to the cam throw. This, of course, is the normal functioning of a brake shoe actuating cam. In addition, however, the positive engagement of the cam teeth 39 with the roller teeth 40 produces a positive and non-slipping rotation of the rollers upon their eccentric drum pivots 62. The eccentricity of the roller bores 41 is so oriented with respect to the center line extending through the axis of the actuating cam and of the eccentric drum axes that this rotation of the rollers additionally increases the movement of the pivot pins 60 and the brake shoes from the axis of the actuating cam. The distance of the roller pivot axis from the actuating cam axis is at a minimum in the brake release position of FIGURE 3 and increases upon rotation of the rollers 34 upon the eccentric drums as the brake applying position of FIGURE 4 is reached.

As a result of the eccentric bores 41 and of the adjustable stationary eccentric drums 62, there is obtained a greatly amplified range and rate of movement of the brake shoes from an actuating cam having a given cam throw.

Attention is now specifically directed to FIGURES 3 and 4. The teeth 39 on each of the cam surfaces 36 and 38 extend from the outer end of the cam surfaces to slightly beyond the midportions thereof whereby to ensure adequate tooth engagement, by at least two teeth on each roller and the cam at all times. The concave portions 43 of the surfaces 36 and 38 are smooth and devoid of teeth in order to enable a closer and more compact arrangement of the cam and rollers in the brake released position as shown in FIGURE 3 and also, since teeth here are unnecessary for satisfactory or successful operation, to simplify manufacture.

Integrally connected with the roller pivot or axle 60 and thus with the eccentric 62 are axially spaced locking elements in the form of disks or circular members 64 at each end of the axle which are likewise provided with teeth slidable into the splines or teeth 54 of the bushings 46.

It is important to note that the locking elements 54 of the bushings extend throughout only a portion of the axial extent of the bores through the bushings so that upon a predetermined extent of sliding movement of the axle 60 in these bushings, the axle locking elements 64 may be selectively moved into engagement with the locking elements 54 of the pair of bushings or may be selectively released or disengaged therefrom. A spring washer 68 encircles the axle 60 and yieldingly abuts against one of the bushings 46 and against an adjacent end of the eccentric 62 and thus of the associated axle 60 in order to yieldingly urge the axle into a slidably and axially shifted position in which the locking elements of the axle and eccentric are engaged with the locking elements 54 of the two bushings thereby retaining the eccentrics in a rotationally adjusted position.

Figure 7:
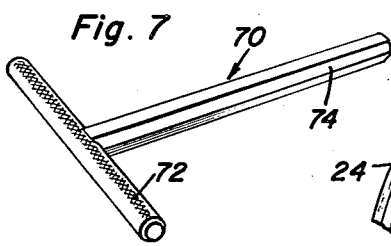
FIGURE 7 is a perspective view of an adjusting tool which may be satisfactorily employed to effect the adjustment of the cam followers in accordance with this invention; and, FIGURE 8 is a fragmentary perspective view showing more clearly a portion of the brake shoe upon which the brake shoe roller pivots are mounted.

In order to effect this shifting movement against the resistance of the spring washer which yieldingly urges the locking means into engaged position, a suitable tool such as that indicated generally by the numeral 70 of FIGURE 7 may be employed. This tool is T-shaped consisting of a handle 72 together with a stem 74. The stem is preferably non-circular in cross-section and the tool is utilized by inserting the stem through aligned access openings 76 in the back wall 78 of the brake drum backing plate, as shown in FIGURE 5, forming a part of the conventional wheel brake assembly and through the opening of the bushings 46 and into a socket 80 of a cross-sectional area and shape complementary to that of the stem 74 of the tool and which is formed in the adjacent end of the axle 60. By pressing inward on the tool, the axle and the eccentric may be shifted against the resistance of the spring means 68 to move the locking elements on the axle or eccentric out of engagement with the locking elements in the bushings thereby permitting the tool to be utilized to effect rotation of the axle and thus effect the desired rotational adjustment of the eccentrics and the cam followers 34 carried thereby. In this manner, it is obvious that any desired clearance may be given to the brake shoe linings 26 and the adjacent cylindrical surface 16 of the brake drum. When the desired precise adjustment is obtained for the brake shoe, the tool is withdrawn whereupon the spring means will axially shift the axle and eccentric towards the left as viewed in FIGURE 5 and thus engage the locking elements to thereby maintain the cam followers in their adjusted positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A brake assembly including a stationary brake shoe carrier and a rotatable brake drum, a pair of arcuate brake shoes each having a fixed pivotal mounting at one end upon said carrier and being movable about said pivoted end for movement towards and from said brake drum, actuating means connected to the other end of each brake shoe and operable for urging said shoes toward said drum into brake engaged position, means for moving said shoes away from said drum into brake released position, said actuating means including an S-shaped actuating cam pivoted upon said carrier and having toothed surfaces, cam followers each having a toothed surface engaging one of said actuating cam surfaces, mounting means adjustably pivoting each cam follower upon said other end of one of said brake shoes, said mounting means including a pair of spaced bearing supports, axles each mounted in and extending between said bearing supports on one of said brake shoes, an eccentric fixed on each axle, each cam follower being journaled upon an eccentric, means for locking at least one of said axles in a rotationally adjusted position in its bearing supports whereby to adjustably vary the spacing of said axles from each other.

2. The combination of claim 1 wherein said locking means comprises a pair of complementary relatively movable and releasable locking elements on each of said bearing supports and on an axle, means for effecting selective relative movement of said pair of locking elements between unlocking and locking positions whereby to respectively release said axle for rotation and adjustment of said eccentric and to lock said axle against rotation and adjustment of said eccentric.

3. The combination of claim 2 including means mounting said axle for axial shifting movement between said locked and unlocked positions.

4. The combination of claim 3 wherein said locking element on said bearing support comprises a bushing having internal locking teeth, said axle locking element comprising locking teeth thereon slidable into and out of engagement with said bushing teeth.

5. The combination of claim 4 including means engaging said axle and resiliently urging the latter axially into locked position.

6. The combination of claim 5 including an access opening in said bearing support for admission of a tool whereby to effect axial shifting of the associated axle from its locked to its unlocked position.

7. The combination of claim 6 wherein the last mentioned means engaging said axle comprises a spring element surrounding said axle and abuttingly engaging said eccentric and an associated bearing support.

8. An adjustable brake construction including a stationary brake shoe carrier and a rotatable brake drum, a pair of arcuate brake shoes cooperating with said brake drum and each having a pivotal mounting at one end thereof upon said carrier, actuating means engaging and disposed between the other ends of said brake shoes for urging the latter apart and into engagement with said brake drum, means for returning said brake shoes towards each other and out of brake drum engagement, said actuating means comprising an S-shaped actuating cam pivoted upon said carrier and having a pair of actuating surfaces, cam followers each engaging one of said actuating surfaces, means mounting said cam followers upon the other ends of said brake shoes, said mounting means comprising each a pair of spaced bearing supports on said other end of a brake shoe, an axle extending between said pair of bearing supports and journaled for both axial and rotary movement, an eccentric on said axle, a cam follower being journaled on said eccentric, means for locking said eccentric in rotationally adjusted positions whereby to adjustably vary the spacing of said axle from said actuating cam.

9. The combination of claim 8 wherein said locking means comprises complementary locking elements on a bearing support and on said eccentric, said locking elements being so spaced that they will be selectively engaged and disengaged upon axial sliding of said axle.

10. The combination of claim 9 wherein said bearing support locking element includes a bushing, said locking elements including cooperating projections in said bushing and on said axle.

11. The combination of claim 10 including resilient means engaging said eccentric and yieldingly urging the latter into a position for locking engagement of said locking elements.

12. A brake assembly including a stationary brake shoe carrier and a rotatable brake drum, a pair of arcuate brake shoes each having a fixed pivotal mounting at one end upon said carrier and being movable about said pivoted end for movement towards and from said brake drum, actuating means connected to the other end of each brake shoe and operable for urging said shoes toward said drum into brake engaged position, means for moving said shoes away from said drum into brake released position, said actuating means including a double lobed actuating cam pivoted upon said carrier and having toothed surfaces, cam followers each having a toothed surface engaging one of said actuating cam surfaces, mounting means adjustably pivoting each cam follower upon said other end of one of said brake shoes, said mounting means each including a pair of spaced bearing supports, axles each mounted in and extending between said bearing supports on one of said brake shoes, a cylindrical drum eccentrically fixed on each axle, each cam follower having therein an eccentrically positioned bore by which it is journaled on one of said drums, means for locking at least one of said axles in a rotationally adjusted position in its bearing supports, whereby to adjustably vary the spacing of said cam followers from each other.

13. A brake assembly including a stationary brake shoe carrier and a rotatable brake drum, a pair of arcuate brake shoes each having a fixed pivotal mounting at one end upon said carrier and being movable about said pivoted end for movement towards and from said brake drum, actuating means connected to the other end of each brake shoe and operable for urging said shoes toward said drum into brake engaged position, means for moving said shoes away from said drum into brake released position, said actuating means including an actuating cam movably mounted upon said carrier and having a pair of toothed surfaces, cam follower rollers each having a toothed surface engaging one of said actuating cam surfaces for simultaneous movement of said rollers in response to movement of said actuating cam, mounting means adjustably pivoting each cam follower upon said other end of one of said brake shoes, said mounting means each including a pair of spaced bearing supports, axles each mounted in and extending between said bearing supports on one of said brake shoes, a cylindrical drum eccentrically fixed on each axle, each cam follower having therein an eccentrically positioned bore by which it is journaled on one of said drums, means for locking at least one of said axles in a rotationally adjusted position in its bearing supports whereby to adjustably vary the spacing of said cam followers from each other.

14. A brake assembly including a stationary brake shoe carrier and a rotatable brake drum, a pair of arcuate brake shoes each having a fixed pivotal mounting at one end upon said carrier and being movable about said pivoted end for movement towards and from said brake drum, actuating means connected to the other end of each brake shoe and operable for urging said shoes toward said drum into brake engaged position, means for moving said shoes away from said drum into brake released position, said actuating means including an actuating cam mounted on said carrier for movement between said other ends of said brake shoes between brake operating and brake releasing positions, said actuating cam having a pair of toothed actuating surfaces, cam follower rollers each having a toothed surface engaging one of said actuating cam surfaces, mounting means pivoting each cam follower roller upon said other end of one of said brake shoes, axles each mounted in the mounting means of a brake shoe, a cylindrical drum fixed eccentrically upon each axle, each cam follower roller having a bore disposed eccentrically therein by which it is journaled upon a drum, means for locking one of said axles in selective rotational adjustment in its mounting means whereby to adjustably vary the spacing of said other ends of said brake shoes.

15. The combination of claim 14 wherein said actuating cam toothed surfaces are variably spaced from each other along their length whereby to vary the spacing between said cam follower rollers.

No references cited.

EUGENE G. BOTZ, *Primary Examiner.*

ARTHUR L. LA POINT, *Examiner.*